United States Patent [19]

Kazama

[11] 4,150,186
[45] Apr. 17, 1979

[54] COMPOSITE BOARD STRUCTURE AND A METHOD OF AND AN APPARATUS FOR PRODUCING THE BOARD STRUCTURE

[75] Inventor: Norio Kazama, Yokohama, Japan

[73] Assignee: Nissan Motor Company, Limited, Yokohama, Japan

[21] Appl. No.: 817,497

[22] Filed: Jul. 20, 1977

[30] Foreign Application Priority Data

Jul. 21, 1976 [JP] Japan .................................. 51-87067

[51] Int. Cl.² ........................... B32B 3/28; B32B 3/10
[52] U.S. Cl. .................................. 428/140; 156/210; 296/137 A; 428/137; 428/138; 428/182; 428/186; 428/178; 428/212; 428/332
[58] Field of Search ............... 428/182, 184, 186, 332, 428/139, 140, 137, 138, 212; 156/210; 296/137 A

[56] References Cited

U.S. PATENT DOCUMENTS

| 206,436 | 7/1878 | Greene | 428/138 |
| 2,234,517 | 3/1941 | Coffman | 428/182 |
| 3,616,010 | 10/1971 | Dunholter et al. | 156/210 |
| 4,093,482 | 6/1978 | Ogata et al. | 428/182 |

FOREIGN PATENT DOCUMENTS

| 2310871 | 12/1976 | France | 428/182 |
| 210082 | 1977 | Japan. | |

Primary Examiner—George F. Lesmes
Assistant Examiner—P. Thibodeau

[57] ABSTRACT

A composite board structure comprising a corrugated fiberboard and a facing web which is attached to the outer face of a liner of the corrugated fiberboard by means of a layer of a hot melt adhesive material between the liner and the facing web, the liner being formed with perforations and the layer of the hot melt adhesive material having embossed spot portions respectively filling in the perforations in the liner. Such embossed spot portions are formed by building up a partial vacuum in the open spaces between the layer of the hot melt adhesive material and the corrugated paper medium forming part of the corrugated fiberboard.

9 Claims, 3 Drawing Figures

COMPOSITE BOARD STRUCTURE AND A METHOD OF AND AN APPARATUS FOR PRODUCING THE BOARD STRUCTURE

The present invention relates to a composite board structure and, more particularly, to a composite board structure including a corrugated fiberboard and featuring a three-dimensionally curved configuration. The present invention is further concerned with a method of and an apparatus for producing such a composite board structure.

A composite board structure to which the present invention appertains generally comprises a corrugated fiberboard and a facing web of a woven or non-woven fabric or a thermoplastic material. The corrugated fiberboard includes at least one liner and at least one corrugated paper medium which is bonded at the tops of its ridge portions to the inner face of the liner. The facing web is bonded over its total area to the outer face of the liner by means of a thermoplastic adhesive material such as a hot melt adhesive material of a thermoplastic synthetic resin polymer. Composite board structures having such a basic construction are not only useful as ordinary packaging materials but find a wide variety of practical applications where insulation of heat and/or sound and/or dampening of mechanical vibrations is a serious requirement. The composite board structures have therefore proved useful particularly as interior linings for walls, floors and ceiling panels of residential or office buildings or as facings, trims and interlayers for various structural member of automotive vehicles, ships, boats and aircrafts, for their stiffness, excellent heat and sound absorbing abilities, light-weight constructions, low production and installation costs, since techniques to have the board structures curved in a three-dimensional fashion have been developed.

The liners of corrugated fiberboards in general are coated with water-repellent compositions such as paraffin over the outer faces thereof for the purpose of protecting the fiberboards from the attack of moisture. The facing web bonded by fusion of a hot melt adhesive material to the outer face of the liner in the corrugated fiberboard forming part of a composite board structure of the above described nature tends to be partially peeled off together with the layer of the hot melt adhesive material from the paraffin coated surface of the liner during use of the board structure. This critically impairs the external appearance and accordingly the commercial value of the composite board structure especially where the board structure is used or to be used as a surface-covering material with the facing web exposed to the outside. The present invention contemplates elimination of such a drawback inherent in conventional composite board structures using corrugated fiberboards.

It is, accordingly, an important object of the present invention to provide an improved composite board structure including a corrugated fiberboard having a facing web securely attached to the outer face of the liner forming part of the corrugated fiberboard.

It is another important object of the present invention to provide a method of producing such an improved composite board structure in a simple and economical manner.

It is still another important object of the present invention to provide an apparatus adapted to put the method into practice.

In accordance with a first outstanding aspect of the present invention, there is provided a composite board structure comprising a corrugated fiberboard having at least one liner and at least one corrugated paper medium bonded at the tops of its ridge portions on one side of the paper medium to the inner face of the liner by means of a first layer of a thermoplastic adhesive material, and a facing web securely attached to the outer face of the liner by means of a second layer of a thermoplastic adhesive material, wherein the liner is formed with a plurality of perforations and the second layer of the thermoplastic adhesive material has embossed spot portions respectively filling in the perforations and coalescing at their ends with the first layer of the thermoplastic adhesive material. The above mentioned corrugated fiberboard may comprise spaced, parallel first and second liners, the first liner constituting the aforesaid liner formed with the perforations, the corrugated paper medium being bonded at the tops of its ridge portions on the other side of the paper medium to the inner face of the second liner by means of a third layer of a thermoplastic adhesive material, the second liner being formed with a plurality of perforations which are open to the open spaces between the first liner and the corrugated paper medium.

In accordance with a second outstanding aspect of the present invention, there is provided a method of producing a composite board structure from a substantially flat blank of a corrugated fiberboard including at least one liner formed with a plurality of perforations and at least one corrugated paper medium bonded at the tops of its ridge portions on one side of the paper medium to the inner face of the liner by means of a first layer of a thermoplastic adhesive material, and a flexible facing web substantially coextensive with the fiberboard, comprising superposing the facing web on the outer face of the corrugated fiberboard with a substantially flat second layer of a thermoplastic adhesive material interposed between the facing web and the fiberboard, pressing the fiberboard and the facing web against each other, applying heat to each of the fiberboard and the facing web for causing the thermoplastic adhesive material forming the above mentioned second layer to be thermally fused between the facing web and the liner to the fiberboard, developing a partial vacuum between the liner and the corrugated paper medium of the fiberboard for causing the fused thermoplastic material between the liner and the facing web to be sucked into the aforesaid perforations in the liner and reach the first layer of the thermoplastic adhesive material on the inner face of the liner through the perforations, and thereafter allowing the resultant assembly of the fiberboard and facing web to cool until the fused thermoplastic material is set. The corrugated fiberboard thus forming part of the composite board structure produced in this fashion may include first and second liners, the first liner constituting the aforesaid liner formed with the perforations and the aforesaid corrugated paper medium being bonded at the tops of its ridge portions on the other side of the paper medium to the inner face of the second liner, the second liner and the corrugated paper medium being formed with perforations which are open to the open spaces between the corrugated paper medium and the first layer of the thermoplastic adhesive material. In this instance, the above mentioned vacuum is built up in the individual open spaces by providing communication between a source of vacuum and the open spaces through the perforations in the second liner and the corrugated paper medium. Where the composite board structure thus produced is to be used as a surface-covering material to be attached to a curved surface, the corrugated fiberboard and the facing web are deformed as a single unit into a three-dimensionally curved configuration when pressed and heated and substantially inelastically maintain the configuration when cooled.

In accordance with a third important aspect of the present invention, there is provided an apparatus for producing a three-dimensionally curved composite board structure, comprising first and second die blocks at least one of which is movable into and out of a position forming a predetermined gap between the die blocks, the first die block being partially recessed to form a three-dimensionally curved depression which is open toward the second die block and the second die block being formed with a land protruding toward the depression in the first die block and configured substantially conformingly to the depression, drive means for moving at least one of the first and second die blocks into the aforesaid position, heating means for heating the first and second die blocks, and suction generating means operative to develop a partial vacuum in the depression in the first die block when the depression is closed between the first and second die blocks.

The features and advantages of a composite board structure according to the present invention and a method of and an apparatus for manufacturing such a composite board structure in accordance with the present invention will become more apparent from the following description taken in conjunction with the accompanying drawings, in which.

Figure 1:
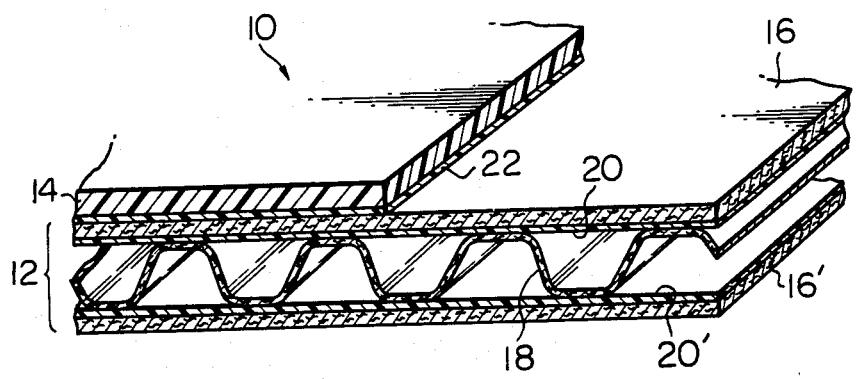
FIG. 1 is a fragmentary perspective view showing a portion of a prior-art composite board structure using a corrugated fiberboard as a basic sheet material.

Referring to FIG. 1 of the drawings, a prior-art composite board structure designated in its entirety by reference numeral 10 is shown comprising a double-faced or single-wall corrugated fiberboard 12 and a facing web 14 of, for example, non-woven fabric or a suitable synthetic resin polymer such as cellular foams of polyurethane. The corrugated fiberboard 12 is composed of a pair of even-surfaced liners 16 and 16' which are spaced apart in parallel from each other and an internal corrugated paper medium 18 which is sandwiched between the two lines 16 and 16'. The corrugated paper medium 18 is bonded at the tops of its ridge portions on both side thereof to the respective inner faces of the liners 16 and 16' by means of thin layers 20 and 20', respectively, of hot melt adhesive coatings or films usually of a thermoplastic synthetic resin polymer such as, for example, polyethylene so that the liners 16 and 16' and the internal corrugated paper medium 18 are consolidated into a unitary laminar construction. The facing web 14 is usually even-surfaced and is bonded over one of its faces to the outer face of one liner 16 of the corrugated fiberboard 12 also by means of a thin layer 22 of a hot melt adhesive coating or film of a thermoplastic synthetic resin polymer. Where the composite board structure 10 thus constructed of the corrugated fiberboard 12 and the facing web 14 is to be utilized as an interior trim or lining for the door structure or the roof panel of the body structure of an automotive vehicle or to be attached to any structure or member having a curved surface, the composite board structure 10 as a whole is thermally deformed under pressure on a suitable hydraulically operated or otherwise powered hot press (not shown) which per se is well known in the art and is inelastically shaped into a predetermined three-dimensionally curved configuration conforming to the curved surface to which the composite board structure 10 is to be attached. While the composite board structure 10 is being heated on the hot press, the layers 20, 20' and 22 of the hot melt adhesive coatings or films in the board structure 10 are fused to produce molten bonds at and in the vicinity of the tops of the individual ridges of the corrugated paper medium 18 and between the facing web 18 and one liner 16 of the corrugated fiberboard 12. When the composite board structure 10 thus processed is removed from the hot press and is allowed to cool, such molten bonds are set between the individual laminae so that the composite board structure 10 as a whole is enabled to maintain the overall configuration thereof. If the facing web 14 is made of a flexible material such as a non-woven fabric, only the corrugated fiberboard 12 may be processed on a hot press, whereupon the facing web 14 is glued or otherwise securely attached to the outer face of one liner 16 of the corrugated fiberboard 12 which has been shaped into a desired configuration.

As is well known in the art of corrugated fiberboard, it is an ordinary practice to have the liners of a corrugated fiber-board coated with a water-repellent composition such as, typically, paraffin over the outer faces thereof. When, therefore, the facing web 14 is bonded to the outer face of the liner 16 of the corrugated fiberboard 12 by fusion of the layer 22 of the hot melt adhesive coating or film therebetween, the facing web 14 tends to be partially peeled off together with the hot melt adhesive coating or film thereon from the paraffin-coated outer face of the liner 16 during use of the composite board structure 10. This critically impairs the external appearance and accordingly the commercial value of the composite board structure 10 as a surface-covering material. The present invention aims at resolution of such a problem encountered by a composite board structure using a corrugated fiberboard including at least one liner and a facing web bonded by means of a hot melt adhesive coating or film to the paraffin-coated outer face of the liner, as previously noted.

Figure 2:
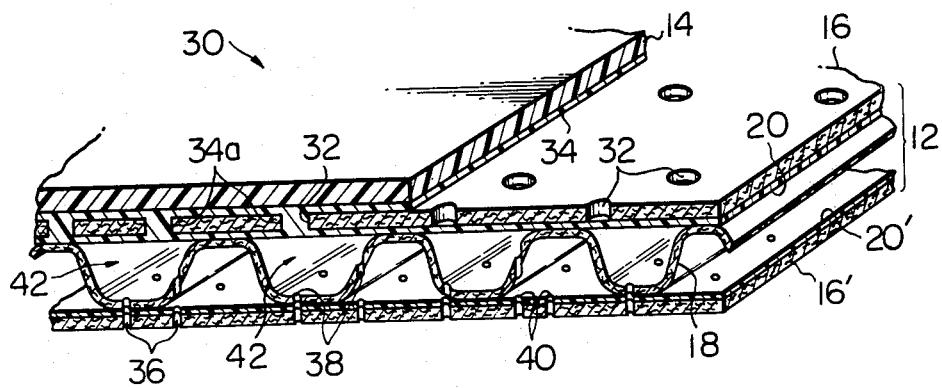
FIG. 2 is a view similar to FIG. 1 but shows a preferred embodiment of a composite board structure according to the present invention.

Referring to FIG. 2, a preferred embodiment of a composite board structure according to the present invention is designated in its entirety by reference numeral 30 and is shown by way of example as being constructed of component sheet materials which are basically similar to those of the prior-art composite board structure 10 illustrated in FIG. 1. The composite board structure 30 embodying the present invention is thus shown consisting of the combination of a double-faced or single-wall corrugated fiberboard 12 and an even-surfaced facing web 14 and, furthermore, the corrugated fiberboard 12 is shown comprising spaced parallel, even-surfaced first and second liners and an internal corrugated paper medium 18 which is interposed between the two liners 16 and 16'. The facing web 14 is assumed by way of example to be formed of cellular foams of polyurethane. The internal corrugated paper medium 18 is bonded at the tops of its ridge portions on one side of the paper medium to the inner face of the first liner 16 by means of a thin first layer 20 of a hot melt adhesive material and at the tops of its ridge portions on the other side of the paper medium to the inner face of the second liner 16' by means of a thin second layer 20' of a hot melt adhesive material, as in the corrugated fiberboard 12 forming part of the prior-art composite board structure 10 illustrated in FIG. 1. The hot melt adhesive material forming the first and second layers 20 and 20' is assumed to be a thermoplastic synthetic resin polymer such as polyurethane.

In the composite board structure 30 embodying the present invention, that liner of the corrugated fiberboard 12 to which the facing web 14 is bonded, viz., the first liner 16 is formed with a myriad of perforations 32 which are distributed substantially uniformly throughout the total area of the liner 16. While the cross sections of the perforations 32 thus formed in the first liner 16 may be sized and configured as desired, it is herein assumed that each of the perforations 32 has a generally circular cross section preferably measuring from about a millimeters to about 4 millimeters in diameter. The perforations 32 thus configured and sized are distributed preferably at intervals of from about 30 millimeters to about 50 millimeters from one another throughout the total area of the first liner 16.

The facing web 14 is bonded to the outer face of the thus perforated first liner 16 by means of a thin third layer 34 of a hot melt adhesive material which is in part spread between the inner face of the facing web 14 and the outer face of the perforated first liner 16 and in part fills in the individual perforations 32 in the liner 16. The third layer 34 of the hot melt adhesive material between the facing web 14 and the perforated first liner 16 is thus formed with a myriad of embossed spot portions 34a respectively filling in the perforations 32 in the liner 16. The embossed spot portions 34a coalesce at their ends with the first layer 20 of the hot melt adhesive material on the inner face of the perforated first liner 16 through the perforations 32. The first and third layers 20 and 34 of the hot melt adhesive materials adhering to the respective inner faces of the first liner 16 and the facing web 14 thus cohere to each other through the perforations 32 in the liner 16 so that the facing web 14 is bonded to the liner 16 not only by means of the third layer 34 of the hot melt adhesive material between the facing web 14 and the liner 16 as in the prior-art composite board structure 10 shown in FIG. 1 but additionally by the aid of the first layer 20 of the hot melt adhesive material on the inner face of the first liner 16 and the embossed spot portions 34a of the hot melt adhesive material bridging the first and third layers 20 and 34. The hot melt adhesive material forming the third layer 34 between the facing web 14 and the first liner 16 and the embossed spot portions 34a may be any of the thermoplastic synthetic resin polymers which are presently known but is preferably of the type which is homogeneous to the thermoplastic synthetic resin polymer forming the first hot melt adhesive layer 20 on the inner face of the perforated first liner 16. Such a thermoplastic synthetic resin polymer may be selected from the group consisting of polyethylene, polypropylene, polyvinyl chloride (PVC), polyvinyl acetate, polystyrene, ethylene-propylene copolymers and ethylene-vinyl acetate copolymers. If desired, a filler of talc, for example, may be added to the thermoplastic synthetic resin polymer.

The composite board structure 30 thus having the first and third layers 20 and 34 of the hot melt adhesive materials united together through the perforations 32 in the first liner 16 can be produced having an initially flat blank by the use of a hot press (not shown) having matingly shaped male and female die blocks which are movable relative to each other into and out of positions having the blank of the board structure interposed and pressed therebetween. The die blocks are kept heated to a predetermined temperature higher than the softening points of the hot melt adhesive materials forming the layers 20, 20' and 34 in the blank and have the blank pressed therebetween so that the blank is deformed into a predetermined configuration conforming to the curved surface of an article to which the resultant composite board structure is to be attached. When the blank of the composite board structure is being pressed and heated between the die blocks, the thus molten hot melt adhesive materials forming the first, second and third layers 20, 20' and 34 in the blank are fused between the individual components of the blank and the hot melt adhesive material of the third layer 34 between the facing web 14 and the perforated first liner 16 is forced to flow into the perforations 32 in the liner 16 by virtue of the compressive force being exerted on the facing web 14 and the liner 16. The molten hot melt adhesive material thus entering the perforations 32 in the first liner 16 forms the embossed spot portions 34a in the perforations 32 and coalesces the first layer 20 of the molten hot melt adhesive material on the inner face of the perforated first liner 16. When the curved composite board structure 30 thus produced is removed from the hot press, the molten hot melt materials forming the layers 20, 20' and 34 and the embossed spot portions 34a are allowed to set and maintain the curved configuration of the board structure 30.

Figure 3:
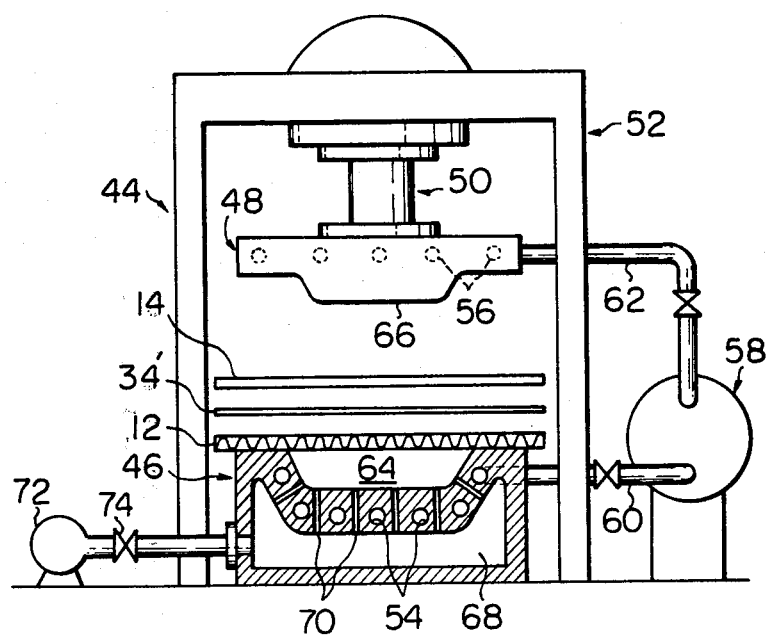
FIG. 3 is a front elevation view showing, partly in vertical section, a preferred embodiment of an apparatus according to the present invention.

The above described process is a most basic method of producing a composite board structure according to the present invention and may therefore be modified in numerous manners if desired. FIG. 3 illustrates an apparatus which is adapted to produce a three-dimensionally curved composite board structure of the nature shown in FIG. 2 by forcibly drawing the molten hot melt adhesive material into the perforations 32 in the first liner 16 from the third layer 34 between the facing web 14 and the liner 16 with the agency of a suction induced between the first and second liners 16 and 16' while the blank of composite board structure is being heated and deformed by a compressive force applied thereto. To put such a method into practice, the blank of the composite board structure to be processed by the apparatus shown in FIG. 3 has formed a multiplicity of perforations 36 in the second liner 16' opposite to the first liner 16 covered with the facing web 14 and a multiplicity of perforations 38 in the corrugated paper medium 18 between the first and second liners 16 and 16', as shown in FIG. 2. The perforations 38 in the corrugated paper medium 18 are open to the open spaces 40 formed between the corrugated paper medium 18 and the first layer 20 of the hot melt adhesive material and are in communication with the perforations 36 in the second liner 16' of the corrugated fiberboard 12 through perforations 42 which are formed in the second layer 20' of the hot melt adhesive material between the liner 16' and the corrugated paper medium 18. The perforations 36, 38 and 42 thus formed in the second liner 16', corrugated paper medium 18 and second hot melt adhesive layer 20' of the corrugated fiberboard 12 are preferably smaller in size than the perforations 32 in the liner 16 of the fiberboard 12.

Referring to FIG. 3, the apparatus to process a blank of the above described nature is shown comprising a down-stroke type hydraulic hot-press 44 having a first or lower stationary female die block 46 and a second or upper movable male die block 48 which is positioned above the stationary female die block 46. The movable male die block 48 is supported by the plunger of a hydraulic cylinder 50 mounted on a top cross member of a frame structure 52 so as to be vertically movable toward and away from the lower stationary female die block 46. The die blocks 46 and 48 have formed therein nestings of hot-fluid circulating passageways 54 and 56, respectively, which are communicable with a hot-fluid source 58 through valved pipes 60 and 62, respectively. The pipe 62 leading from the upper movable male die block 48 is arranged to be partially flexible for allowing the die block 48 to vertically move relative to the hot-fluid source 58 which is held stationary.

The lower stationary female die block 46 has an upper wall portion which is partially downwardly recessed to form therein a depression 64 which is open at the upper end of the die block 46 and which is shaped in conformity to a desired overall configuration of a curved composite board structure to be obtained. On the other hand, the upper movable male die block 48 has a lower wall portion which is partially downwardly protruded to form a land 66 which is configured generally conformingly to the depression 64 in the female die block 46 and in such a manner as to form a certain clearance between the die blocks 46 and 48 when the upper movable male die block 48 is moved into a predetermined lowermost position closest to the lower stationary female die block 46. The clearance thus formed between the die blocks 46 and 48 has a predetermined thickness which is substantially equal to the desired thickness of the composite board structure to be finally formed on the hot-press 44.

The lower stationary female die block 46 is further formed with a cavity 68 and a suitable number of passageways or through holes 70 each of which is open at one end to the depression 64 in the die block 44 and at the other end to the cavity 68 for providing constant communication between the cavity 68 and the internal space of the depression 64. The cavity 68 in the die block 46 is communicable with a suitable source of vacuum such as a pneumatic suction pump 72 through a valved suction pipe 74.

While a composite board structure 10 according to the present invention may be produced by the use of the apparatus shown in FIG. 3 from a unitary blank having the facing web preliminarily attached to the liner of the corrugated fiberboard 12 by means of a layer of a hot melt adhesive material, it will be advantageous for reducing the number of steps of production to produce the composite board structure from a substantially flat blank of a corrugated fiberboard 12 and a facing web 14 which are separate from each other as shown in FIG. 3.

Before starting the apparatus of FIG. 3, the upper movable male die block 48 is held in its uppermost vertical position over the lower stationary female die block 46 as shown with the hydraulic cylinder 50 and the pneumatic suction pump 72 held at rest. The source 58 of the hot-fluid may be rendered operative so as to keep the die blocks 46 and 48 heated to predetermined temperatures by the hot fluid supplied from the hot-fluid source 58 to the hot-fluid circulating passageways 54 and 56 in the die blocks 46 and 48, respectively.

The flat blank of the corrugated fiberboard 12 which is separate from the facing web 14 is horizontally placed on the downwardly recessed lower stationary female die block 46 with the perforated first liner 16 of the fiberboard 12 situated on the upper side of the fiberboard so that the depression 64 in the die block 46 is closed by the lower second liner 16' of the fiberboard 12 as seen in FIG. 3. A thin film 34' of a hot melt adhesive material is then placed on the outer face of the upper first liner 16 of the corrugated fiberboard 12 on the die block 46 and thereafter the facing web 14 is placed on the upper face of the film 34.

When the hydraulic cylinder 50 is then actuated, the upper movable male die block 46 is driven to move downwardly by the plunger of the cylinder 50 and is brought into pressing contact with the facing web 14. As the die block 48 is further moved downwardly and has the land 66 projecting into the depression 64 in the lower stationary female die block 46, the corrugated fiberboard 12 and the facing web 14 are partially deformed within the depression 64. The plunger of the cylinder 50 is brought to a stop when the upper movable male die block 48 reaches a predetermined vertical position having the corrugated fiberboard 12 and the facing web 14 closely pressed upon between the two die blocks 46 and 48. The corrugated fiberboard 12 and the facing web 14 thus brought into intimate contact with the die blocks 46 and 48, respectively, are heated by the heat which is transferred to the fiberboard 12 and the facing web 14 from the hot fluid in the passageways 54 and 56 in the die blocks 46 and 48, respectively, with the result that the layers 20 and 20' of the hot melt adhesive materials in the corrugated fiberboard 12 and the film 34' of the hot melt adhesive material between the fiberboard 12 and the facing web 14 (FIG. 2) are softened and fused by the heat which is transferred from the fiberboard 12 and the facing web 14. The temperature and the quantities of the hot fluid supplied to the die blocks 46 and 48 from the hot-fluid source 58 are, thus, selected in such a manner as to enable the corrugated fiberboard 12 and the facing web 14 to be heated to temperatures to heat each of the layers and film of the hot melt adhesive materials to a temperature higher than the softening point of the hot melt adhesive material of each of the layers or the film.

The hot melt adhesive material forming each of the first and second layers 20 and 20' in the corrugated fiberboard 12 being thus fused by heat, the corrugated paper medium 18 is intimately bonded at the tops of its ridges on both sides of the paper medium 18 to the respective inner faces of the liners 16 and 16'. The hot melt adhesive material forming the film 34' between the corrugated fiberboard 12 and the facing web 14 is also fused to form a layer 34 of the fused hot melt adhesive and enables the facing web 14 to be bonded to the outer face of the perforated first liner 16 of the fiberboard 12. When the pneumatic suction pump 72 is started under these condition, a partial vacuum is built up between the lower face of the fiberboard 12 on the female die block 46 and the partially recessed upper face of the die block 46 through the valves suction pipe 74 and the cavity 68 and passageways 70 in the die block 46. The vacuum extends into individual open spaces 42 between the corrugated paper medium 18 and the layer 34 of the fused hot melt adhesive through the perforations 36 and 38 in the second liner 16' and the corrugated paper medium 18, respectively, of the fiberboard 12. The vacuum thus acts on the layer 34 of the hot melt adhesive material through the perforations 32 in the first liner 16 of the fiberboard 12 with the result that the fused hot melt adhesive forming the layer 34 between the outer face of the liner 16 and the inner face of the facing web 14 is partially forced into the individual perforations 32 and thus forms embossed spot portions 34a in the perforations 32 as shown in FIG. 2. The embossed spot portions 34a of the layer 34 reach the first layer 20 of the hot melt adhesive material fused on the inner face of the first liner 16 of the fiberboard 12 and coalesce with the layer 20.

The layers 20 and 34 of the hot melt adhesive materials being thus bridged by the embossed spot portions 34a of the layer 34, the facing web 14 is securely attached to the outer face of the first liner 16 of the corrugated fiberboard 12 not only by the layer 34 of the hot melt adhesive between the facing web 14 and the liner 16 but by the embossed spot portions 34a of the layer 34 and the first layer 20 of the hot melt adhesive material on the inner face of the liner 16.

When the composite board structure 10 is thus completed, the suction pump 72 is shut off and thereafter the hydraulic cylinder 50 is actuated to drive the upper movable male die block 48 to move upwardly so as to enable the composite board structure 10 to be released from the die block 46. The composite board structure 10 is then removed from the lower stationary female die block 46 and is left to cool so that the fused hot melt adhesive material forming each of the layers 20, 20' and 34 in the board structure 10 is allowed to set and inelastically maintain the three-dimensionally curved configuration of the board structure 10.

What is claimed is:

1. A composite board structure comprising: a corrugated fiberboard having at least one liner and at least one corrugated paper medium bonded at the tops of its ridge portions on one side of the paper medium to the inner face of the liner by means of a first layer of a thermoplastic adhesive material, and a facing web securely attached to the outer face of said liner by means of a second layer of a thermoplastic adhesive material, wherein said liner is formed with a plurality of perforations and wherein the second layer of the thermoplastic adhesive material is integral with said first layer of the thermoplastic adhesive material through said perforations and has embossed portions respectively filling in said perforations and coalescing with said first layer of the thermoplastic adhesive material through said perforations.

2. A composite board structure as set forth in claim 1, in which said corrugated fiberboard comprises spaced, parallel first and second liners, the first liner constituting said liner formed with the perforations, said corrugated paper medium being bonded at the tops of its ridge portions on the other side of the paper medium to the inner face of said second liner by means of a third layer of a thermoplastic adhesive material, said second liner being formed with a plurality of perforations which are open to the open spaces between said first liner and said corrugated paper medium.

3. A composite board structure as set forth in claim 1, in which each of said perforations has a generally circular cross section having a diameter within the range of between 2 and 4 millimeters.

4. A composite board structure as set forth in claim 3, in which said perforations are distributed at intervals of 30 to 50 millimeters from one another.

5. A composite board structure as set forth in claim 2, in which said perforations in said second liner are smaller in cross sectional area than said perforations in said first liner.

6. A composite board structure as set forth in claim 2, in which said corrugated paper medium is formed with perforations in its ridge portions on said other side of the paper medium, said perforations in said second liner being open to said open spaces through said perforations in the corrugated paper medium.

7. A composite board structure as set forth in claim 2, in the thermoplastic adhesive material forming each of said first, second and third layers is a thermoplastic synthetic resin polymer selected from the group consisting of polyethylene, polypropylene, polyvinyl chloride, polyvinyl acetate, polystyrene, ethylene-propylene copolymers, and ethylene-vinyl acetate copolymers.

8. A composite board structure as set forth in claim 1, in which the respective thermoplastic adhesive materials forming said first and second layers are of the types which are homogeneous to each other.

9. A composite board structure as set forth in claim 1, having a three-dimensionally curved portion.

* * * * *